US007031709B2

(12) United States Patent
Watanabe et al.

(10) Patent No.: US 7,031,709 B2
(45) Date of Patent: Apr. 18, 2006

(54) METHOD AND ASSOCIATED APPARATUS FOR INCREMENT ACCURACY OF GEOGRAPHICAL FOREIGN AGENT TOPOLOGY RELATION IN HETEROGENEOUS ACCESS NETWORKS

(75) Inventors: Fujio Watanabe, San Jose, CA (US); Jingjun Cao, Mountain View, CA (US); Toshio Miki, Cupertino, CA (US)

(73) Assignee: NTT DoCoMo, Inc., (JP)

( * ) Notice: Subject to any disclaimer, the term of this patent is extended or adjusted under 35 U.S.C. 154(b) by 393 days.

(21) Appl. No.: 10/263,031

(22) Filed: Oct. 1, 2002

(65) Prior Publication Data

US 2004/0192307 A1    Sep. 30, 2004

Related U.S. Application Data

(60) Provisional application No. 60/370,302, filed on Apr. 5, 2002.

(51) Int. Cl.
*H04Q 7/20* (2006.01)
(52) U.S. Cl. .................. 455/436; 455/440; 455/435.1
(58) Field of Classification Search ............... 455/436, 455/440, 435.1; 370/331
See application file for complete search history.

(56) References Cited

U.S. PATENT DOCUMENTS

2002/0045450 A1* 4/2002 Shimizu et al. .......... 455/442

2004/0196808 A1* 10/2004 Chaskar et al. .......... 370/331

OTHER PUBLICATIONS

Perkins, C., "IP Mobility Support", *IETF RFC2002*, Oct. 1996, 79 pages.
Stemm, M. and R. H. Katz, "Vertical handoffs in wireless overlay networks", *Mobile Networks and Applications*, vol. 3, No. 3, 1998, pp. 335-350.
Brewer E. A. et al., "A Network Architecture for Neterogeneous Mobile Computing", *IEEE Pers. Commun.*, vol. 5, No. 5, Oct. 1998, pp. 8-24.
Campbell, A. T. et al., "Design, Implementation and Evaluation of Cellular IP", *IEEE Pers. Commun.*, vol. 7, No. 4, Aug. 2000, pp 42-49.
Walsh, R. et al., "Hybrid Networks—A Step Beyond 3G", *WPMC*, Bangkok, Nov. 2000, pp. 109-114.
Wu, G, et al., "Wireless Internet over Heterogeneous Wireless Networks", *IEEE*, 2001, 7 pages.

(Continued)

*Primary Examiner*—George Eng
*Assistant Examiner*—Julie E Stein
(74) *Attorney, Agent, or Firm*—Edward C. Kwok; MacPherson Kwok Chen & Heid LLP

(57) ABSTRACT

One aspect of the present invention regards a method of coordinating the handoff of a mobile carrier between a first access network and a second access network, the method including handing off from a first access network that the mobile carrier is currently operating within to a second access network and building a physical access network topology based on the handing off without input from either the first access network or the second access network.

25 Claims, 11 Drawing Sheets

OTHER PUBLICATIONS

Keller, R. et al., "Convergence of Cellular and Broadcast Networks from a Multi-Radio Perspective", *IEEE Pers. Commun. Mag*, Apr. 2001, pp. 51-56.

Kaliokulju L, et al. "Radio Access Selection for Multistandard Terminals", *IEEE Pers. Commun.Mag.*, vol. 39, No. 10, Oct. 2001, pp. 116-124.

Cao, J. et al. "Building Future Mobile Wireless Internet Service Infrastructure: An Introduction to Hyper Operator", submitted to GLOBECOM'02, in 2002, pp. 1-5.

Watanabe, F. et al. "Geographical Access Network Topology Estimation in Heterogeneous Access Networks", *IEEE VTC Broadband Wireless Symposium '02*, paper No. 775, 2002, 5 pages.

Watanabe, F. et al. "Physical Access Network Topology Map in Hyper Operator Overlay Architecture", *IEEE*, 2002, 5 pages.

Campbell, A. T. et al., "Comparison of IP Micromobility Protocols", *IEEE Wireless Commun. Mag.*, vol. 9 No. 1, Feb. 2002, pp 72-82.

Weinstein, S. "The mobile internet: wireless LAN vs. 3G cellular mobile", *IEEE Commun. Mag.*, vol. 40 No. 2, Feb. 2002, pp 26 and 28.

Wu, G. "MIRAI Architecture for Heterogeneous Network", *IEEE Commun. Mag.*, vol. 40 No. 2, Feb. 2002, pp 126-134.

* cited by examiner

FIG.6

| type | S | B | D | M | G | V | rsv | Lifetime |
|------|---|---|---|---|---|---|-----|----------|
| Home Address ||||||||||
| Home Agent ||||||||||
| Care-of Address ||||||||||
| Identification ||||||||||
| Extension ||||||||||

METHOD AND ASSOCIATED APPARATUS FOR INCREMENT ACCURACY OF GEOGRAPHICAL FOREIGN AGENT TOPOLOGY RELATION IN HETEROGENEOUS ACCESS NETWORKS

Applicants claim, under 35 U.S.C. § 119(e), the benefit of priority of the filing date of Apr. 5, 2002, of U.S. Provisional Patent Application Ser. No. 60/370,302 filed on the aforementioned date, the entire contents of which are incorporated herein by reference.

BACKGROUND OF THE INVENTION

1. Field of the Invention

The present invention relates to the field of wireless networks.

2. Discussion of Related Art

It is well known that a number of networks and service providers can exist simultaneously within a particular geographical area. With this environment in mind, establishment of communication between a mobile device within the geographical area and another communication device often involves the handoff of the signal from one network to another network as the person operating the mobile device moves within the geographical area. Since there often are many variations in access networks, service providers and mobile devices, it is very difficult to assure seamless communication within the geographical area for a variety of mobile devices.

One proposal at establishing seamless communication for mobile users as well as application service providers is to use a Hyper Operator Overlay architecture, such as described in F. Watanabe, J. Cao, S. Kurakake, "Geographical access network topology estimation in heterogeneous access networks," IEEE VTC'02 paper no. 775.

An example of a known Hyper Operator Overlay network architecture is schematically shown in FIG. 1. The Hyper Operator Overlay (HOO) network architecture 100 combines different access networks to provide the most suitable access network to each available service. The HOO network 100 includes different access networks 102A–D, service/content providers 104A–B and a hyper operator 106 located in the Internet. Nodes 112A–D of the access networks 102A–D are in communication with Hyper Operator Overlay nodes 114A–B of the Internet which are in turn in communication with a Hyper Operator Overlay node 114C. Thus, nodes 112A–D are in communication with Hyper Operator Overlay node 114C. The hyper operator 106 communicates with the Hyper Operator Overlay nodes 114A–C, access networks 102A–D, service providers 104A–B and company intranet 108 and works to coordinate different access networks and service providers 104A–B (such as, yahoo.com) including private intranets (e.g. company intranet 108) in order to have seamless communications.

The mobile device, such as a cell phone, PDA or a lap top computer 110, supports different access network technologies such as WLAN, mobile phone, Bluetooth, ADSL, etc. Instead of having several service agreements with different access networks 102 and service providers 104, a user using the mobile device will only need to have a single service agreement with the hyper operator 106. Because of a service contract with the hyper operator 106, the user can gain access to different access networks 102 by the mobile device without establishing new service contracts.

The HOO network 100 does not require modifications to existing access networks. The HOO network 100 can work as a broker or a bridge between different access networks and service providers, and can coordinate service offered by different access networks and service providers. As described in S. Weinstein, "The mobile internet: wireless LAN vs. 3G cellular mobile," IEEE Commun. Mag., vol. 40 no. 2, pp. 26–28, February 2002, the HOO network 100 has three features of interest:

1) For end users who are already subscribers of major service providers, transparent Internet access is provided in many local environments without having to subscribe with each Palm LAN operator 2) For major service providers, extension of services offered to their subscribers without having to invest in additional access infrastructure; and 3) For public access wireless LAN operators, a vast potential user population acquired without having to sign up individual customers.

In the hierarchical coverage area of the HOO network 100, there may be a variety of sizes of access networks, as described in E. A. Brewer et al., "A network architecture for heterogeneous mobile computing," IEEE Pers. Commun., vol. 5, no. 5, pp. 8–24, October 1998 and M. Stemm and R. H. Katz, "Vertical handoffs in wireless overlay networks," Mobile Networks and Applications, vol. 3, no. 3, pp. 335–350, 1998. An access network with small coverage area has a relatively high-bandwidth, while an access network with large coverage area has a relatively small bandwidth. The vertical handoff between different access networks can be classified into two categories: an upward vertical handoff is a handoff to a wireless overlay with a larger cell size (and lower-bandwidth) and a downward vertical handoff is a handoff to a wireless overlay with a smaller cell size (and higher bandwidth). It is well known that the upward vertical handoff has a time critical issue of handoff processing time when the mobile device moves out from the access network with a smaller cell to that with a larger cell. Also, a quick authentication and QoS adjustment are required, especially for real time applications such as video and voice, because different access networks possess inherent diversity in terms of operating frequencies, access schemes, QoS supports, monetary costs, and traffic conditions.

However, current independent management for user, mobility, resource allocation, authentication/authorization, security at each access network makes it difficult to coordinate heterogeneity and to maintain connectivity. In addition, minimizing modification of the current access network would be preferable. A couple of schemes to coordinate network heterogeneity and to maintain connectivity have been considered. One approach proposes a common core network to coordinate various access networks as described in G. Wu, "MIRAI architecture for heterogeneous network," IEEE Commun. Mag., vol. 40, no. 2, pp. 126–134, February 2002. This approach attempts to construct the common core network between the Internet and access networks to handle heterogeneity of different access networks. It requires additional modification to converge different network cores whose functions are mobility management, authentication/authorization, paging etc. Therefore, existing access network operators may not be able to join the new common core network architecture easily. In addition, the infrastructure installation cost is expected to increase. Also, the common core network does not absorb heterogeneity of higher layer requirements.

Another approach for coordinating heterogeneity and maintaining connectivity is to use the cooperative and enhanced hybrid networks (DRiVE project) which interface directly with access networks and the Internet as described in R. Walsh, L. Xu, T. Paila, "Hybrid networks—as step beyond 3G," WPMC'00 pp. 109–114, Bangkok, November 2000.

In order to realize both of the above described approaches for mitigating heterogeneity, the new core, which integrates an independent management owned by each access network, has to be developed and installed. Furthermore, the need for a standardization effort and business commitment is inevitable.

The geographical access network configuration (e.g., location of base station, coverage area, capacity etc) is assumed to be known to the operator because the operator owns its access network. However, the Hyper Operator will not own the access network. It only owns users. Whenever the user uses an access network, the access network operator will charge to the Hyper Operator. In this model, the Hyper Operator may not be able to get geographical access network information easily. Even if the Hyper Operator can get this information, the geographical coverage area, especially WLAN and WPAN (wireless personal area network, like Bluetooth), is dynamically changed. Therefore, the latest geographical access network information is not available in the Hyper Operator.

SUMMARY OF THE INVENTION

One aspect of the present invention regards a method of coordinating the handoff of a mobile carrier between a first access network and a second access network, the method including handing off from a first access network that the mobile carrier is currently operating within to a second access network and building a physical access network topology based on the handing off without input from either the first access network or the second access network.

A second aspect of the present invention regards a method of determining a geographical relationship between a first access network and a second access network as a mobile device moves between a first access network and a second access network. The method includes losing connection with a mobile device located within a first access network, establishing connection with the mobile device within a second access network and determining a geographical relationship between the first access network and the second access network based on a chronological relationship between a time of the losing connection and a time of the establishing connection.

Each of the above aspects of the present invention provides the advantage of coordinating heterogeneity and maintaining connectivity for networks.

Each of the above aspects of the present invention provides the advantage of increasing the accuracy of a geographical access network configuration.

Each of the above aspects of the present invention provides the advantage of estimating a geographical access network configuration even though no operational information is provided from each access network.

The present invention, together with attendant objects and advantages, will be best understood with reference to the detailed description below in connection with the attached drawings.

BRIEF DESCRIPTION OF THE DRAWINGS

FIG. 6 schematically shows an embodiment of a registration request packet (Mobile IP binding update message) that can be sent to the home agents (Hyper Operators) of FIGS. 2 and 5 in accordance with the present invention;

DETAILED DESCRIPTION OF THE INVENTION

In accordance with the present invention the heterogeneity of different access networks is mitigated by coordinating and organizing heterogeneous access networks. As for the coordination, it is important to exchange necessary information between heterogeneous access networks. In order to facilitate the exchange of information, a physical access network topology is built at the Hyper Operator which will automatically collect, analyze, and track the geographical access network configuration, even though each access network operator does not provide physical topology information to the Hyper Operator. Building such a topology is desired since each access network operator may not or can not provide details of access network topology information such as the base station location and the coverage area. Therefore, it is desired to build a network topology that will allow the Hyper Operator to automatically track the physical access network topologies in heterogeneous access networks. It is noted that the physical access network topology map described above represents the geographical relationship among Internet provider subnets of different access networks or 'same access network.

During construction of the physical access network topology described above, a number of factors preferably should be addressed, such as:

1) How is the physical access network topology determined without identifying and interrogating each access network operator?
2) How to update the physical access network topology map?
3) How to improve the accuracy of the physical access network map in view of the fact that the Hyper Operator must estimate the geographical access network configuration? and
4) How is the constructed physical access network topology map to be used in order to improve the mobile device and network performances in terms of vertical handoff, network selection, power consumption etc.?

Figure 1:
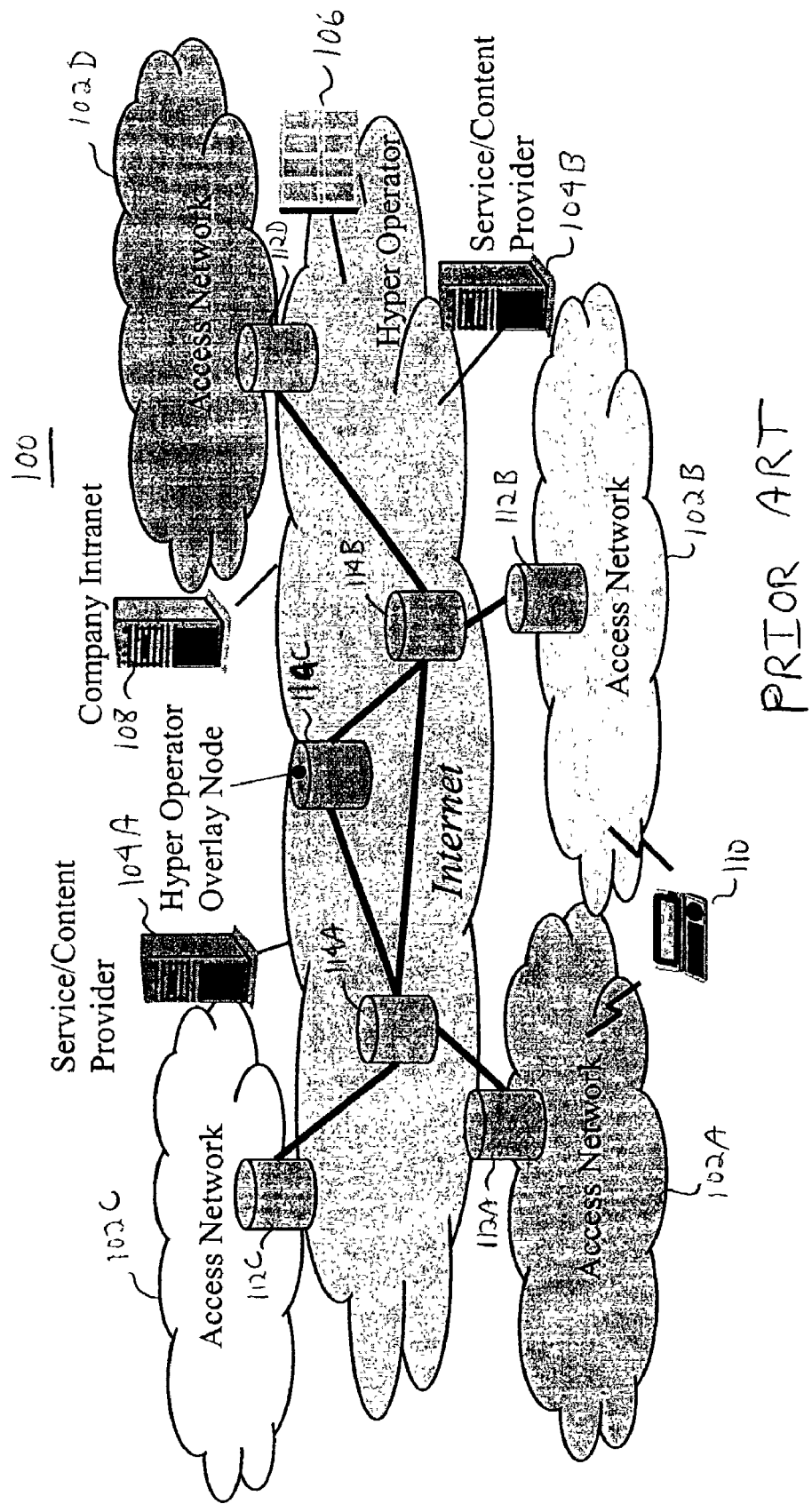
FIG. 1 schematically illustrates a known Hyper Operator Overlay architecture.
Figure 2:
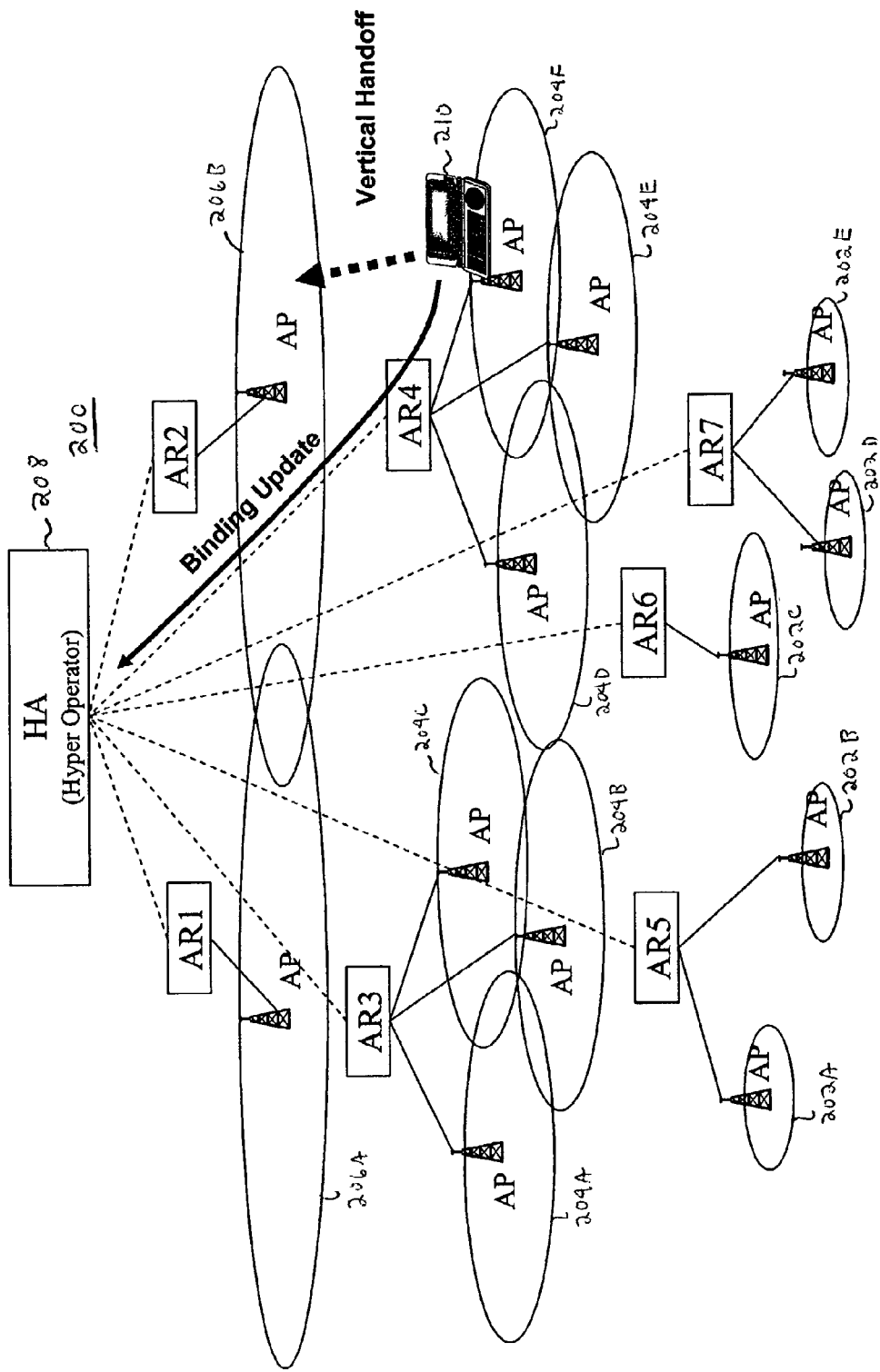
FIG. 2 schematically shows an embodiment of a hierarchical access network environment that is integrated with a Hyper Operator in accordance with the present invention.

Taking into account the above factors, the construction of a physical network topology network map is understood by first reviewing a typical hierarchical access network environment that is integrated with a Hyper Operator as shown in FIG. 2. The access network environment 200 includes a variety of access networks 202A–E, 204A–F, 206A–B that have small, medium and large coverage areas, respectively. As shown in FIG. 2, the access networks 202A–E are in communication with access routers (AR) AR5–7, which can work as a foreign agent of Mobile IP, access networks 204A–F are in communication with access routers AR3–AR4 and access networks 206A–B are in communication with access routers AR1–AR2. Each access router AR1–7 is in communication with the Hyper Operator or home agent 208.

Figure 5:
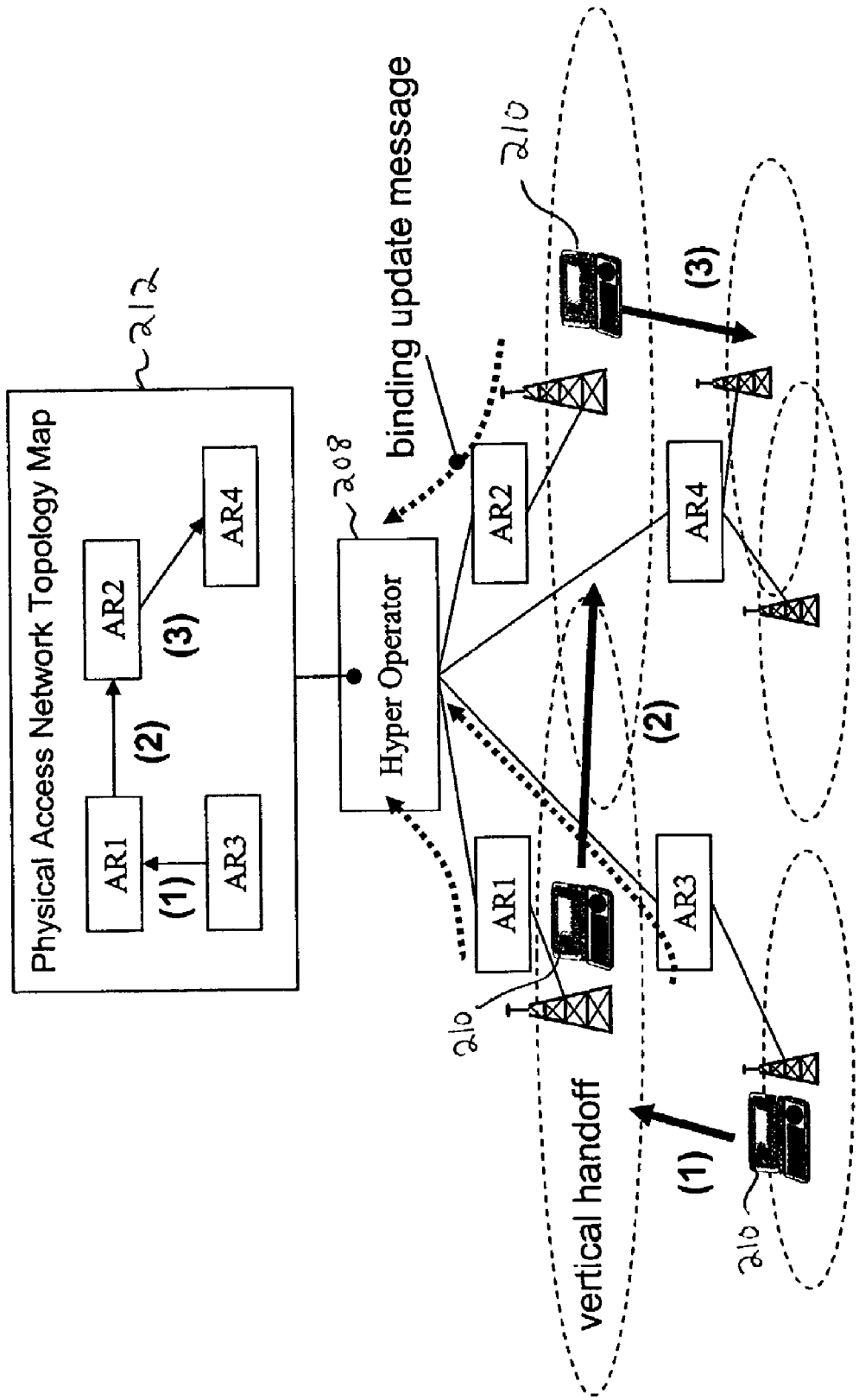
FIG. 5 schematically shows a second embodiment of a hierarchical access network environment that is integrated with a Hyper Operator that illustrates a physical access network topology map constructed in accordance with the present invention.

As described in Hyper Operator Overlay architecture, the layer 3 has a commonality to use IP in each access network. In the architecture of FIG. 2, Mobile IP, such as described in C. Perkins, "IP mobility support," IETF RFC2002, October 1996, is implemented in each access network for the IP mobility. In Mobile IP, the mobile device, such as a cell phone, PDA or a lap top computer 210, sends a binding update message (BU) to the home agent 208 whenever a new care of address (CoA) is obtained from one of the access routers AR1–7. In particular, FIG. 5 shows that the mobile device 210 handoffs from AR3 to AR1, from AR1 to AR2, and from AR2 to AR4. At each handoff, a binding update message is transmitted to the home agent 208. When the home agent 208 accepts the binding update message, the home agent 208 begins to associate the home address of the mobile device with a new care of address and maintain this association until the registration lifetime, the time that binds the home address (permanent IP address) and the care of address (temporary IP address), expires. In this embodiment the mobile device has the home address assigned by the Hyper Operator.

The geographical access network configuration of FIG. 2 over service areas of different access network providers is estimated by using the binding update messages in Mobile IP. Because of the care of address (CoA) change in case of the handoff, the receiving of a new binding update message indicates a geographical overlapping between a previous associated subnet and a new subnet. When the Hyper Operator (works as a home agent) tracks the binding update message, the physical access network topology map representing IP subnets relation can be built at the Hyper Operator. According to this map, the user is aware of current neighboring access networks after the user downloads the physical access network topology map or gets information from the Hyper Operator through a current associated network. Note that constructing the physical access network topology map based on the binding update message according to the present invention provides for mobility management, appropriate access network selection and energy efficiency.

Sending the binding update message explicitly indicates that the mobile device obtains different care of address from the new access router, however, this binding update message does not indicate whether the care of address change has occurred by the handoff or not. If the binding update message is originally triggered by the handoff, the receiving binding update message implicitly indicates the physical coverage overlapping between the current access router and the target access router. This is because the handoff occurs only when both the old access router and the new access router are overlapping.

Figure 3:
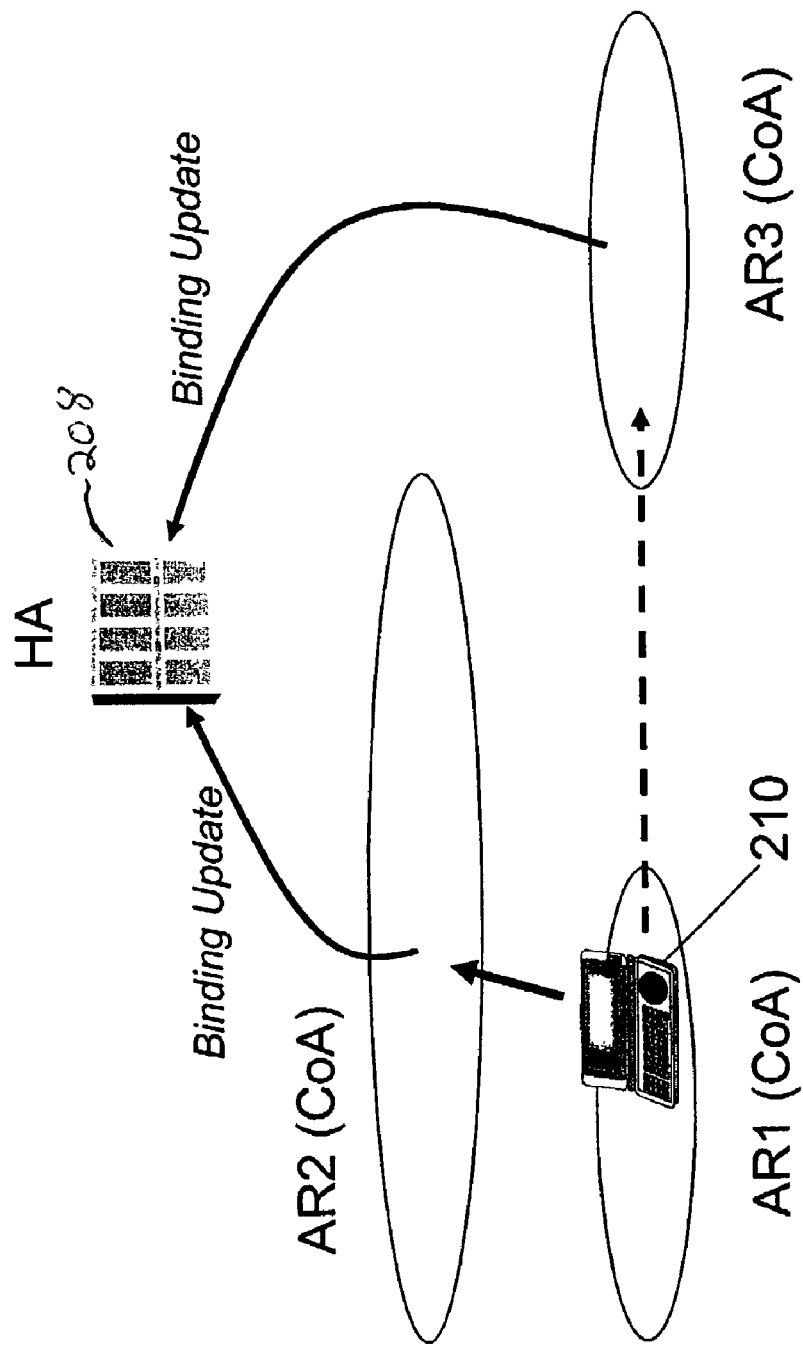
FIGS. 3a–b schematically show various binding update message differences between handoff and non-handoff in terms of the care of address change for the hierarchal access network environment of FIG. 2.

However, one problem with building the physical access network topology map on the binding update messages is that the transmission of a binding update message occurs even if the mobile device is turned-off at one cell and after the mobile device moves to another cell it is turned-on. The trigger difference between handoff and non-handoff in terms of care of address change is illustrated in FIGS. 3(a)–(b). For example, FIG. 3(a) indicates the mobile device handoff, while FIG. 3(b) shows when the mobile device is turn-off and the mobile device moves to another cell before it is turned-on. Both cases cause the care of address to change. Differentiation between the situations illustrated in FIGS. 3(a)–(b) is important to create the access network topology map accurately. This is especially seen in the situation where the mobile device 210 is turned off in one city and then moved to another city. When the mobile device 210 is turned on in the other city, the binding update message is sent to the home agent 208. Consequently, the home agent 208 will misunderstand that the previous access router and the new access router are closer each other, even though these two access routers are located in different places.

Figure 4:
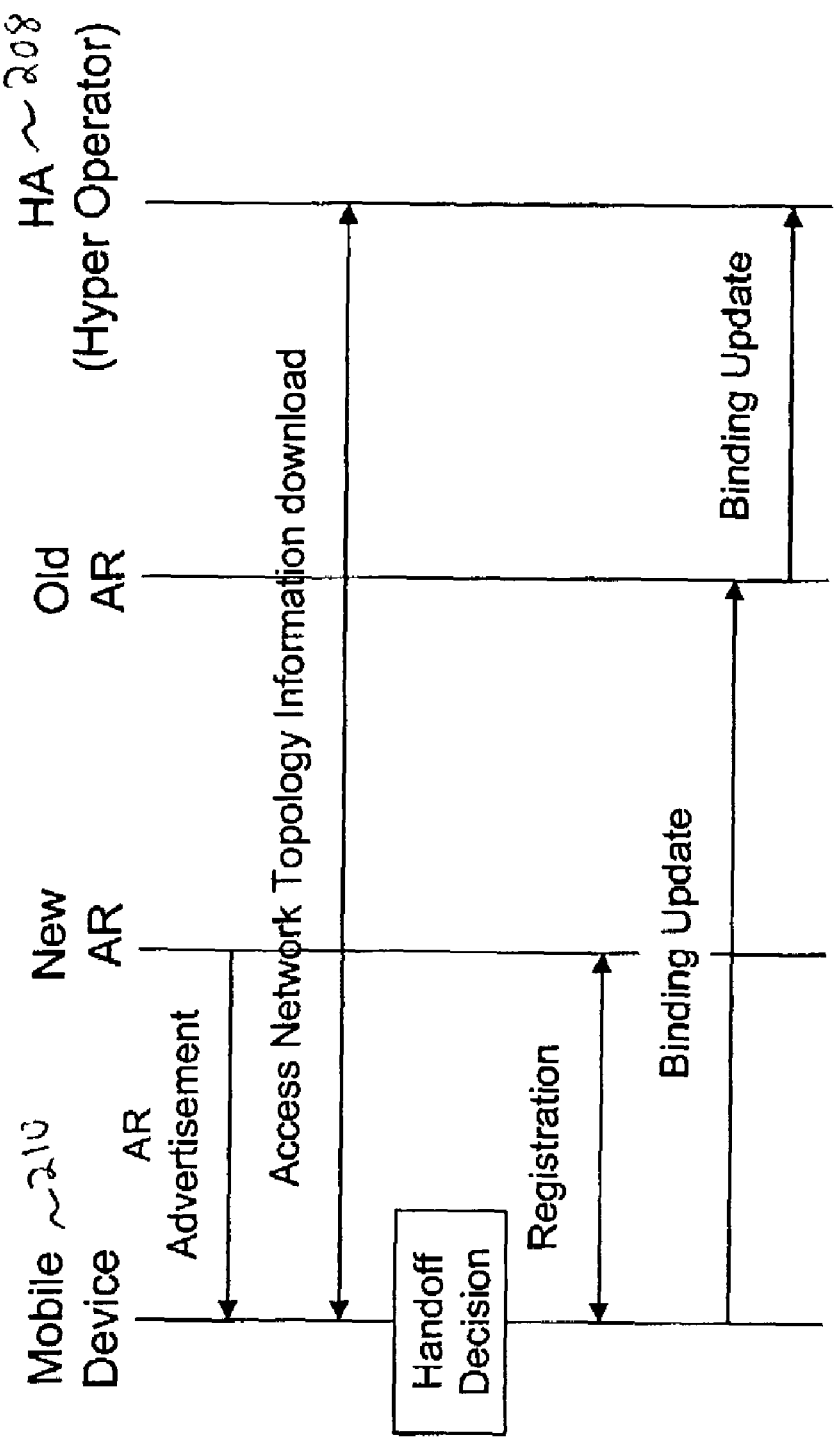
FIG. 4 schematically shows transmission of a binding update message for the hierarchal network environment of FIG. 2 and handoff decision based on an access network topology information in accordance with the present invention.

One solution for this distinction, according to the present invention, is that the binding update message is transmitted through the old access router to the home agent 208 when the mobile device obtains the new care of address, instead of from the new access router to the home agent 208 as done in the past with Mobile IP, as shown in FIG. 4. Examples of such transmission are shown in FIGS. 2 and 5. For instance, in FIG. 2 the binding update message is transmitted from AR4 (old access router) instead of AR2 (new access router). In another example shown in FIG. 5, the binding update message is transmitted from AR3 instead of AR1. In each of the examples of FIGS. 2 and 5, the care of address change between the old access router and the new access router may not indicate the geographical proximity. By tracking care of address change to establish the access network topology map, it is necessary to know which access networks are geographically overlapping. The reason to transmit the binding update message via the old access router is to distinguish the handoff or not for the current care of address change. If the mobile device 210 is able to associate with the new access router and sends a binding update message through the old access router, this indicates that the mobile device 210 is located in the overlapping area between the old and new access routers. This scheme requires only a slight modification in Mobile IP. The difference is that the original Mobile IP uses the new access router to send the binding update message. The use of the old access router to send the binding update message increases the accuracy of the geographical network topology map determined in accordance with the present invention.

After the home agent 208 receives the binding update message, the home agent 208 will update a packet forwarding table which associates the home address of the mobile device 210 with the new care of address based on the binding update message, and at the same time, the home agent 208 constructs an IP relation map between the new care of address and the old care of address.

An advantage of the above mentioned architecture is that even if the home agent 208 cannot obtain the user's location information and access network topology from each access network, the binding update message is always received at the home agent 208 as long as each access network deploys Mobile IP. It is assumed that the access router controls only access points that belong to single access network. Hence, even though the hierarchical mobility management scheme described in A. T. Campbell et al., "Design, implementation and evaluation of cellular IP," IEEE Pers. Commun., vol. 7, no. 4, pp. 42–49, August 2000 and A. T. Campbell et al., "Comparison of IP micromobility protocols," IEEE Wireless Commun., vol. 9, no. 1, pp. 72–82, February 2002, is used, the binding update message will be received at the home agent 208 whenever the associated care of address is changed.

As the home agent 208 receives many binding update messages from different mobile devices, the home agent 208 can build the IP relation map between access networks in the whole service coverage area. Since the different access network has a different IP subnet, IP relation can be considered as an access network relation as well. An example is shown in FIG. 5. The home agent 208 will be distributed over Internet in the architecture, which we call the Hyper Operator Overlay node (114A–C). The Hyper Operator Overlay node has the same functions as the Hyper Operator. In order to have a scalability, the Hyper Operator Overlay node should work as the Hyper Operator. An access router is composed of IP subnet and some access points. Whenever the care of address is changed, the mobile device 210 will send the binding update message to the home agent 208.

According to another embodiment of the present invention, L2 or above L4 information is included into a part of an extension in the binding update message. Since the care of address changes do not indicate the handoff, L2 level or above L4 information included in the binding update message, which explicitly indicates handoff, helps to distinguish the handoff occurrence. FIG. 6 shows the Registration Request packet (the binding update message) that is sent to the home agent 208 and is defined in C. Perkins, "IP mobility support," IETF RFC 2002, October 1996. An extension part of this packet can include L2 level and above L4 information. For instance, as L2 level information, the associated access point MAC address is changed. As for the case when L4 level information is included in the binding update message, such information as whether the device is a mobile device or not, and how fast it can move, etc. is included.

As the binding update message based on the handoff is collected at the home agent 208, IP relation in terms of physical overlapping will be built. As mentioned earlier, different access networks have different IP subnets so that IP relation can be considered to be equivalent to an access network relation. Consequently, the physical access network topology map (access network are physically neighborhood) can be created after some mobile devices handoff between different access networks. The more the handoff occurs among different access networks, the more accurate the relationship between access routers in the physical access network topology map can be affirmed. In FIG. 5, an example of an access network topology map 212 constructed as the result of mobile device 210 moving from AR3 to AR1 to AR2 and AR4 is shown at the home agent 208.

Figure 7:
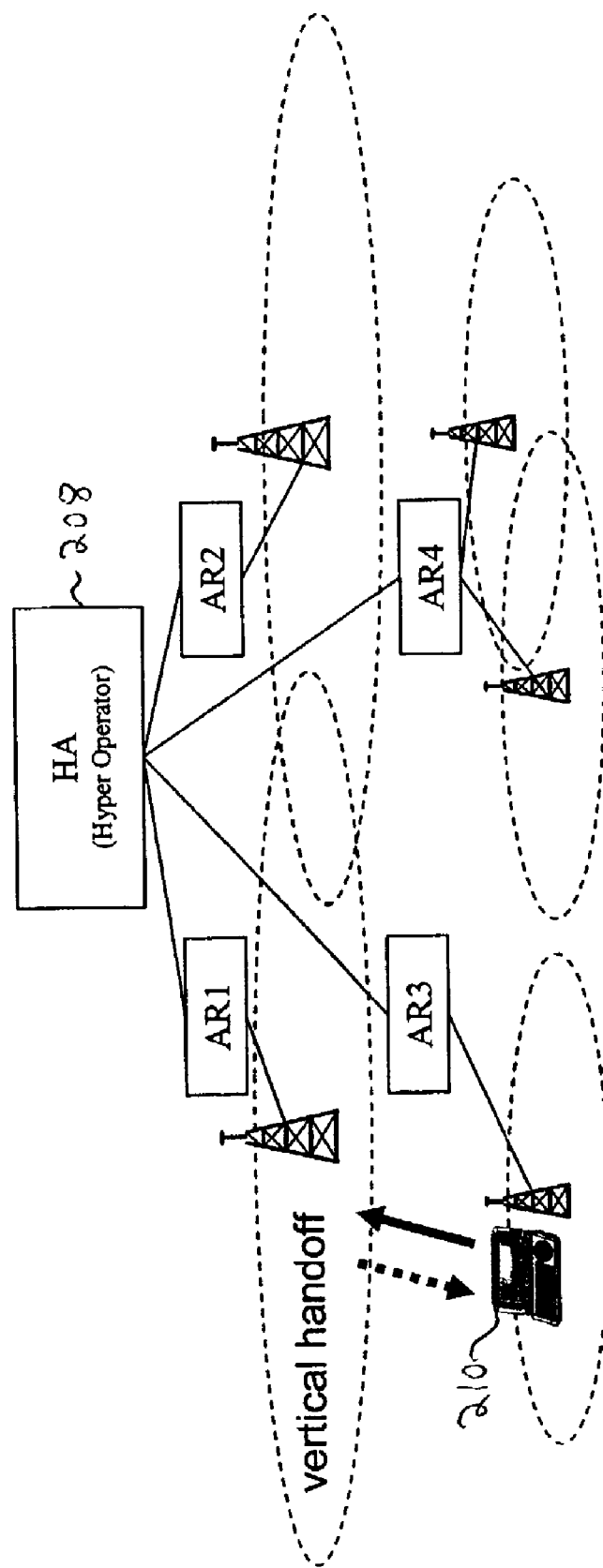
FIG. 7 schematically shows a third embodiment of a hierarchical access network environment that is integrated with a Hyper Operator in accordance with the present invention.
Figure 8:
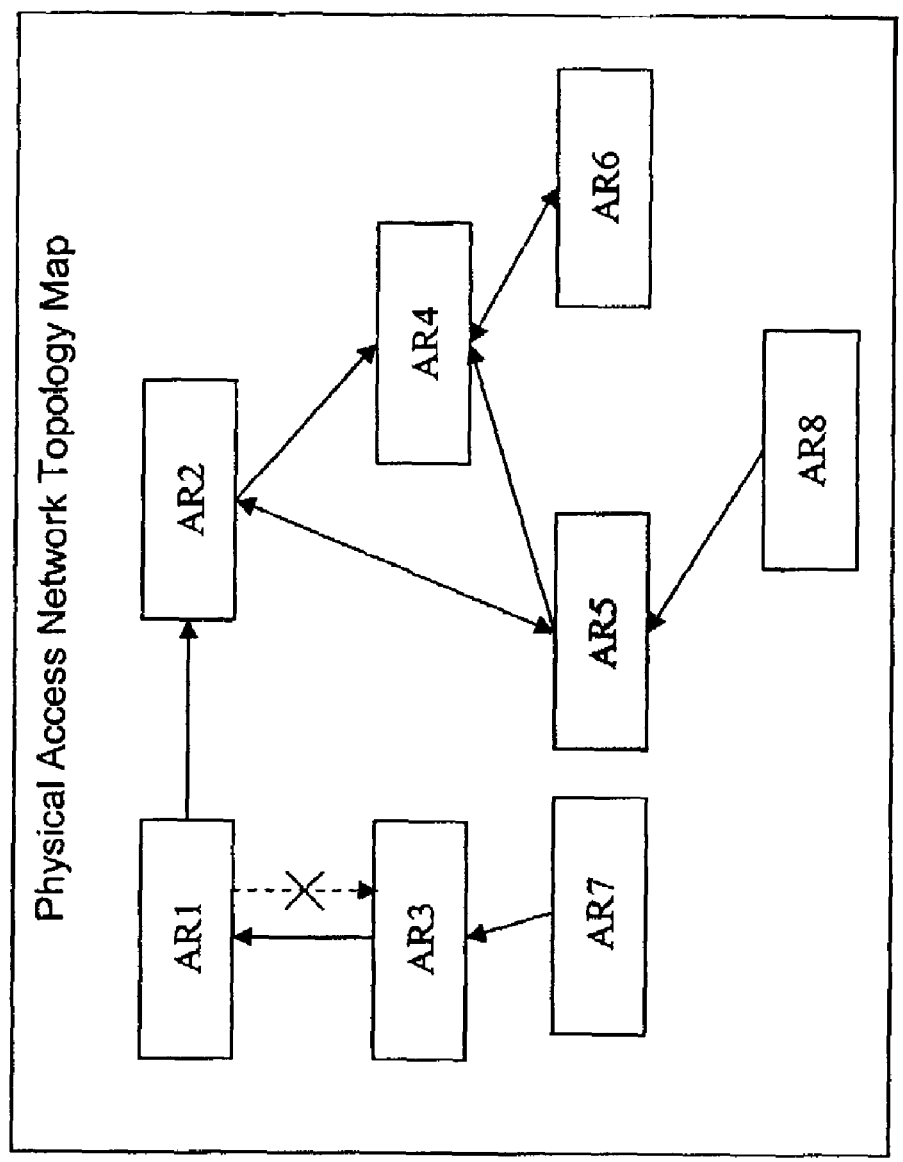
FIG. 8 schematically illustrates an embodiment of a physical access network topology map constructed for the hierarchal access network in accordance with the present invention.

To increase further accuracy of the physical access network topology map, the home agent 208 will track the direction of the handoff. As shown in FIG. 7, the mobile device 210 handoffs from AR3 to AR1, then this map guarantees the physical overlapping and neighboring from AR3 to AR1. However, the binding update message generated by a handoff from AR3 to AR1 will not fulfill a bi-directional handoff between AR3 and AR1 (see FIG. 8). A couple of reasons are: the mobile device 210 located in AR1 (larger cell size) may not be able to handoff to AR3 (smaller cell size) based on the only proximity information between AR1 and AR3. Another case is that the propagation condition is different at a different path. Therefore, the mobile device 210 may not be able to handoff in a mutual way. An important point is that this map may not significantly improve the downward handoff from the larger cell to the smaller cell, since the upward vertical handoff from the smaller cell to the larger cell has a serious time critical problem described in M. Stemm and R. H. Katz, "Vertical handoffs in wireless overlay networks," Mobile Networks and Applications, vol. 3, no. 3, pp. 335–350, 1998. Therefore, this map is still effective to reduce the handoff time, which is needed for the handoff from the smaller cell to the larger cell.

Figure 9:
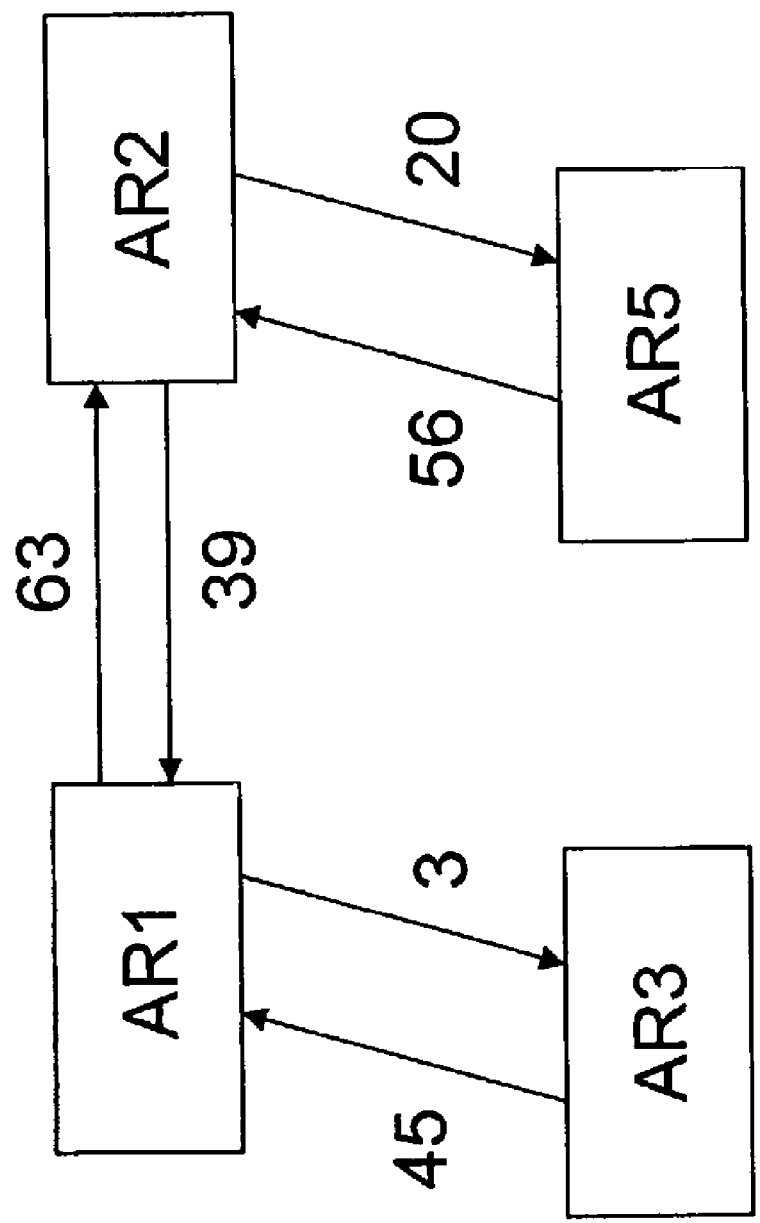
FIG. 9 schematically shows a possible frequency distribution of handoff occurrence between the hierarchal access network of FIG. 7.

Another embodiment of the present invention where the modification of the Mobile IP is minimized makes use of the frequency of the movements between one subnet and another subnet. Based on the number of the care of address changes between one access network and another access network, access network topology relation will be solid. This method does not need to distinguish handoff which will trigger the binding update message transmission. For instance, the home agent 208 may receive several binding update messages from AR3 to AR1 and one binding update message from AR3 to AR4. In this example, the Hyper Operator can affirm the overlapping between AR1 and AR3, but the one between AR3 and AR4 cannot be confirmed because of the low handoff frequency between the two. Another example is shown in FIG. 9. In this example, the number beside the arrow indicates how many time the binding update messages change between access routers. Based on this number, the geographical relationship between the access routers will be taken into account. If the number is large, the probability of handoff chance between the access routers is high. For instance, the mobile device 210 most probably can handoff from AR3 to AR1, but this map will not guarantee the handoff from AR1 to AR3. Thus, based on the frequency of handoff experiences between access routers stored in the Hyper Operator, it can be determined whether or not the mobile device 210 can handoff between particular access routers. This knowledge increases the accuracy of the geographical network topology map determined in accordance with the present invention.

Figure 10:
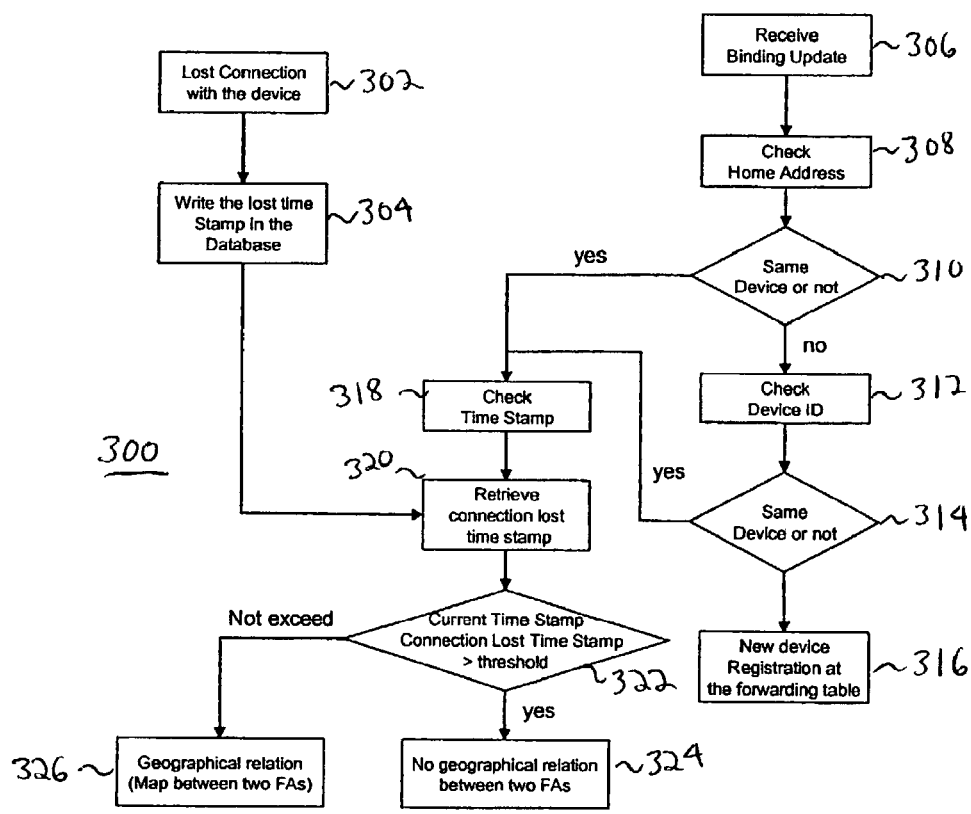
FIG. 10 shows a flow chart of an embodiment of sending a binding update message with a time stamp in accordance with the present invention.

Another embodiment of the present invention where the modification of the Mobile IP is minimized is shown by the flow chart 300 of FIG. 10 where a time stamp is established in the binding update message of Mobile IP, the time stamp is based on the time of receipt of the binding update message. The time stamp is included in the extension of the registration request shown in FIG. 6. The time stamp is used for the case where the mobile device 210 loses connection with one access router and later gains connection with another access router. As shown in FIG. 10, the home agent 208 determines if the mobile device 210 has lost connection with an access router per step 302. Upon detecting a lost connection with an access router, a lost time stamp is established in the database per step 304.

While the home agent 208 determines if connection with a mobile device 210 is lost, the home agent 208 monitors the receipt of binding update messages from the access routers of the network per step 306 since such receipt indicates that a change in access router has occurred. Since the mobile device 210 may have different IP addresses (multiple IP address assignment) for each access network interface (depending on the implementation), therefore the home agent 208 has to identify whether the device associated with the lost connection of step 302 is the one that sends the binding update message of step 306. This is accomplished by first having the home agent 208 check the home address of the mobile device per step 308. If the home addresses for the mobile devices associated with the lost connection and the binding update message are the same, the binding update message is deemed to have originated from the same device per step 310. If the home addresses do not agree, then the identification numbers of the devices are checked per step 312. If the identification numbers do not correspond to one another per step 314, then the home agent 208 will identify the mobile device associated with the binding update message as a new device and will register the new device at a table within the home agent 208 per step 316.

Should the devices be deemed the same at either step 310 or 314, then the home agent 208 will check the time stamp which is included in the binding update message per step 318. As shown in step 322, the home agent 208 will compare the current time stamp with the lost connection time stamp, retrieved per step 320 which was stored in the home agent's database. If the difference of the time exceeds the threshold, such as the maximum time of IP address change, then the home agent 208 will consider that this binding update message is not triggered by the handoff per step 324 and so determine that there is no geographical relationship between the access routers corresponding to the lost connection and the binding update message. For example, suppose the mobile device 210 is turned off, then the user transports the same mobile device 210 to another location. After movement, the mobile device is switched on. In this case, the lost connection time is large enough. So, the home agent 208 can recognize that the binding update message is not originated by the handoff.

Figure 11:
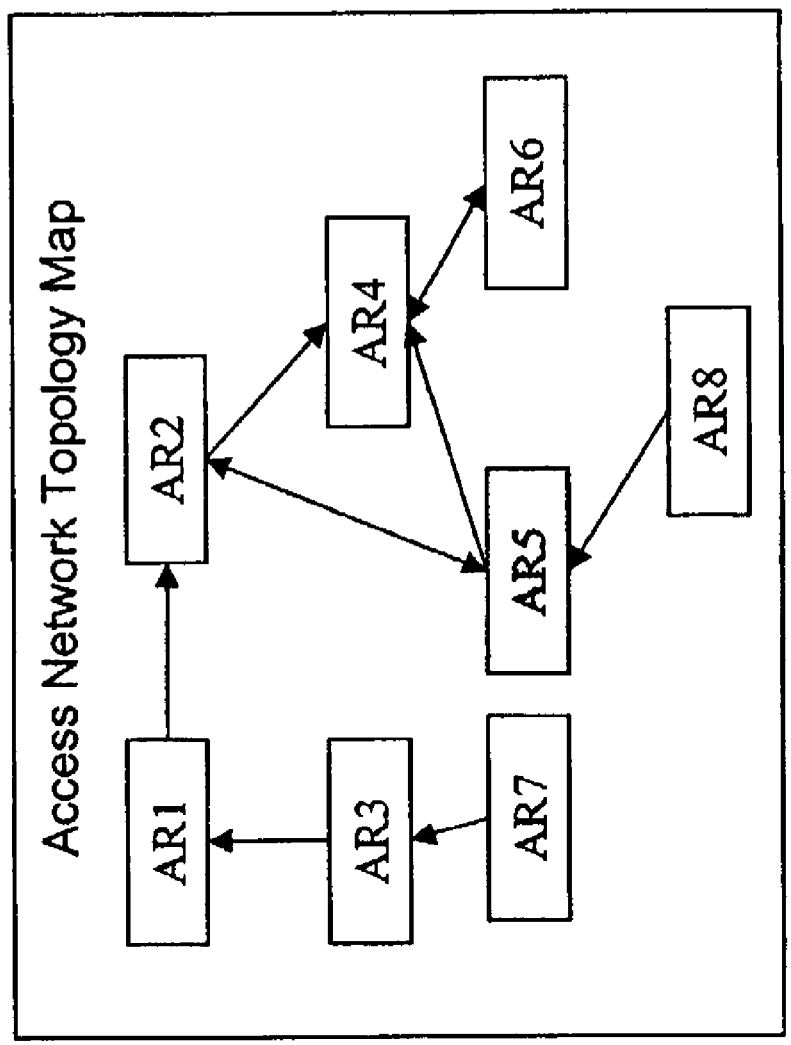
FIG. 11 schematically shows another embodiment of a physical access network topology map based on the directional consideration to be used with the hierarchal access networks in accordance with the present invention.

On the other hand, if the difference of the time does not exceed the threshold, then the home agent 208 will consider that this binding update message is triggered by the handoff per step 326 and that a geographical relation is assumed to be established between the access routers in terms of a function of the difference of the time. Based on the above observation, the physical access network topology map will be updated. This means that the relation between the previous access router and the new access router is mapped in the physical access network topology map as shown in FIG. 11. It is noted that "threshold" will be decided based on the implementation. If the threshold is short, the accuracy of the physical access network topology map is increased but there is a time stamp synchronization problem to be considered. If the synchronization difference time between the mobile device 210 and the home agent 208 is large, it may happen that the value of current time stamp minus connection lost time stamp will be a negative value. Therefore, the map will be inaccurate.

After the Hyper Operator has the access network topology map per the various schemes described previously with respect to FIGS. 2–10, the map can leverage seamless experience for the user. It is assumed that the Hyper Operator has the physical access network topology map as shown in FIG. 11. First of all, the Hyper Operator can identify the mobile device location in terms of IP subnet level based on the current care of address. In the example shown in FIG. 11, the mobile device 210 is currently located in the AR5. As the Hyper Operator has topology information, it shows what access networks are available around the current user's location, which access networks are appropriate for the current application, which access networks are preferable etc. Based on this map, the Hyper Operator identifies the physical relation of other ARs related to the AR5, so that the Hyper Operator can suggest the mobile device which access network interface should be activate. Consequently, the mobile device 210 can save the battery drain because it can turn off unavailable access network interfaces. In this example, the mobile device 210 at AR5 should only turn on the access network interface for AR2 and AR4. Current access network selection in the heterogeneous access network has been studied based on the range, capacity, and delay as described in J. Kaliokulju et al., "Radio access selection for multistandard terminals," IEEE Commun. Mag., vol. 39, no. 10, pp. 116–124, October 2001.

Mainly the market aspect is omitted. However, the Hyper Operator can assist the mobile device; what networks are available around the current user's location, cost of usage based on the user's preference, maximum available bandwidth, and level of security. For example, the Hyper Operator can identify a paging area based on the neighboring access routers around a current access router by using the physical access network topology map.

The foregoing description is provided to illustrate the invention, and is not to be construed as a limitation. Numerous additions, substitutions and other changes can be made to the invention without departing from its scope as set forth in the appended claims.

We claim:

1. A method of determining a geographical relationship between a first access network and a second access network as a mobile device moves between a first access network and a second access network, the method comprising:
   detecting whether or not said first access network has lost connection with said mobile device, and determining a time of said losing connection;
   receiving information regarding said second access network establishing connection with said mobile device, including a time of said establishing connection; and
   determining a geographical relationship between said first access network and said second access network based on said time of said losing connection and said time of said establishing connection.

2. The method of claim 1, wherein said determining a geographical relationship is performed without further input from either said first access network or said second access network other than said information received.

3. The method of claim 1, wherein said determining a geographical relationship is accomplished without identifying or interrogating operators of either said first access network or said second access network.

4. The method of claim 1, wherein said said detecting whether or not the first access network has lost connection is performed through a first access router in said first access network and wherein said information regarding said second access network establishing connection is received from a second access router in said second access network.

5. The method of claim 1,
   wherein said determining a time of losing connection provides a first time stamp based on a time of occurrence of said loss of connection;

wherein said information regarding said second access network establishing connection comprises a second time stamp based on a time of receiving said information regarding said second access network establishing connection, and wherein said determining a geographical relationship is based on said first time stamp and said second time stamp.

6. The method of claim 5, wherein said determining a geographical relationship is based on a difference between said first time stamp and said second time stamp.

7. The method of claim 1, further comprising determining whether or not said mobile device associated with said losing connection is the same as said mobile device associated with said establishing connection.

8. The method of claim 7, wherein said information regarding said second access network establishing connection comprises a binding update message, said method further determining whether said mobile device with said binding update message is the same as said mobile device associated with said losing connection.

9. The method of claim 7, wherein said determining a geographical relationship is performed even if a home address of said mobile device associated with said losing connection is different than a home address of said mobile device associated with said establishing connection.

10. The method of claim 1, further determining whether said mobile device can handoff from a first access router to a second access router based on a frequency of handoff experience between said first access router and said second access router.

11. The method of claim 10, wherein the accuracy of said geographical relationship between said first access network and said second access network is increased based on the frequency of handoff between said first access router and said second access router.

12. The method of claim 1, further comprising handing off from a first access router to a second access router, wherein the accuracy of said geographical relationship between said first access network and said second access network is increased based on transmitting a binding update message through said first access router instead of transmitting through said second access router.

13. A home agent for a mobile device, comprising:
an interface coupled to receive messages from a first access network and a second access network;
a storage unit; and
a central processing unit programmed to perform:
(a) upon receiving information which indicates a time at which the first access network loses a connection with the mobile device, recording in the storage unit the loss of connection; and
(b) upon receiving information from the second access network which indicates a time at which the second access network establishes a connection with the mobile device, determining a geographical relationship between the first access network and the second access network based on the time of recorded loss of connection in the first access network and the time of establishment of connection in the second access network.

14. The home agent of claim 13, wherein the information which indicates a time at which the first access network loses a connection comprises a timestamp indicating the time of the loss of connection and wherein the information which indicates a time at which the second access network establishes a connection comprises a timestamp indicating the time of the establishment of connection.

15. The home agent of claim 14, wherein the geographical relationship is determined based on a difference between said first timestamp and said second timestamp.

16. The home agent of claim 13, wherein the information which indicates a time at which the first access network loses a connection and the information which indicates a time at which the second access network establishes a connection are received from routers in the first access network and the second access network, respectively.

17. The home agent of claim 13, wherein the information which indicates a time at which the second access network establishes a connection comprises a binding update message.

18. The home agent of claim 13, wherein the central processing unit further programmed to determine whether the mobile device associated with the loss of connection is the same as the mobile device associated with the establishment of connection.

19. The home agent of claim 13, wherein the information which indicates a time at which the second access network establishes a connection comprises a binding update message, and wherein the central processing unit is further programmed to determine whether the mobile device sending the binding update message is the same mobile device as that associated with the connection loss.

20. The home agent of claim 13, wherein the home address for the mobile device, associated with the loss of connection is different from the home address for the mobile device associated with the establishment of connection.

21. The home agent of claim 13, wherein the geographical relationship is established based on a frequency of handoff from the first access network to the second access network.

22. The home agent of claim 21, wherein the accuracy of said geographical relationship between said first access network and said second access network is increased based on the frequency of handoff.

23. The home agent of claim 13, wherein the accuracy of the geographical relationship between said first access network and said second access network is increased based on transmitting a binding update message from the second access network via the first access network, instead of transmitting the binding update message from the second access network directly.

24. The home agent of claim 13, wherein the home agent resides in a hyper-operator.

25. The home agent of claim 13, wherein the home agent resides in a router of an access network.

* * * * *